United States Patent
Ju et al.

(10) Patent No.: US 11,780,085 B2
(45) Date of Patent: Oct. 10, 2023

(54) ROBOT POSTURE CONTROL METHOD AND ROBOT AND COMPUTER READABLE STORAGE MEDIUM USING THE SAME

(71) Applicant: UBTECH ROBOTICS CORP LTD, Shenzhen (CN)

(72) Inventors: Xiaozhu Ju, Shenzhen (CN); Mingguo Zhao, Shenzhen (CN); Yuesong Wang, Shenzhen (CN); Youjun Xiong, Shenzhen (CN)

(73) Assignee: UBTECH ROBOTICS CORP LTD, Shenzhen (CN)

(*) Notice: Subject to any disclaimer, the term of this patent is extended or adjusted under 35 U.S.C. 154(b) by 465 days.

(21) Appl. No.: 17/107,966

(22) Filed: Dec. 1, 2020

(65) Prior Publication Data

US 2022/0040851 A1 Feb. 10, 2022

(30) Foreign Application Priority Data

Aug. 4, 2020 (CN) .......................... 202010773743.8

(51) Int. Cl.
*B25J 9/16* (2006.01)
*B25J 13/08* (2006.01)
(Continued)

(52) U.S. Cl.
CPC ............. *B25J 9/163* (2013.01); *B25J 9/1607* (2013.01); *B25J 9/1633* (2013.01); *B25J 9/1638* (2013.01);
(Continued)

(58) Field of Classification Search
CPC ........ B62D 57/02; B62D 57/032; B25J 9/163; B25J 9/1607; B25J 9/1633; B25J 9/1638;
(Continued)

(56) References Cited

U.S. PATENT DOCUMENTS

| 7,949,430 B2 * | 5/2011 | Pratt .................... B62D 57/032 180/8.5 |
| 2022/0040861 A1 * | 2/2022 | El Khadir .............. B25J 9/1666 |

OTHER PUBLICATIONS

Krupke, Christopher et al. "Modelling and Robust Control of an Inverted Pendulum Driven by a Pneumatic Cylinder", 2015 IEEE International Conference on Advanced Intelligent Mechatronics (AIM) (Year: 2015).*

(Continued)

*Primary Examiner* — Adam R Mott
*Assistant Examiner* — Elizabeth Rose Neleski

(57) ABSTRACT

The present disclosure provides a robot posture control method as well as a robot and a computer readable storage medium using the same. The method includes: constructing a virtual model of the robot, wherein the virtual model comprises a momentum wheel inverted pendulum model of the robot and an angle between a sole surface of the robot and a horizontal plane; and performing a posture control based on outer-loop feedback control, inner loop compensation for the external disturbance rejection in position level, inner loop external disturbance rejection via null-space in velocity level, and inner loop external disturbance rejection in force/acceleration level on the robot. In this manner, a brand-new virtual model is provided, which can fully reflect the upper body posture, centroid, foot posture, and the like of the robot which are extremely critical elements for the balance and posture control of the robot.

18 Claims, 11 Drawing Sheets

(51) Int. Cl.
*B62D 57/032* (2006.01)
*B62D 57/02* (2006.01)

(52) U.S. Cl.
CPC ............ *B25J 13/088* (2013.01); *B62D 57/02* (2013.01); *B62D 57/032* (2013.01)

(58) Field of Classification Search
CPC ...... B25J 13/088; B25J 9/1664; B25J 9/1605; B25J 9/1628; G05B 2219/40077; G05B 2219/40264
See application file for complete search history.

(56) References Cited

OTHER PUBLICATIONS

Abeygunawardhana, Pradeep et al. "Vibration Suppression of Two-Wheel Mobile Manipulator Using Resonance-Ratio-Control-Based Null-Space Control", IEEE Transactions on Industrial Electronics, vol. 57, No. 12, Dec. 2010 (Year: 2010).*

* cited by examiner

Constraints:
$$\hat{\psi}_L = \hat{\theta}_{1,pitch}$$
$$\hat{\psi}_R = \hat{\theta}_{1,pitch}$$
$$\hat{z}_L = \hat{\theta}_{2,pitch} \text{ projection of z-axis } +\Delta l_z$$
$$\hat{z}_R = \hat{\theta}_{2,pitch} \text{ projection of z-axis } -\Delta l_z$$
$$\hat{\psi}_W = \hat{\theta}_{3,pitch}$$

ROBOT POSTURE CONTROL METHOD AND ROBOT AND COMPUTER READABLE STORAGE MEDIUM USING THE SAME

CROSS REFERENCE TO RELATED APPLICATIONS

The present disclosure claims priority to Chinese Patent Application No. 202010773743.8, filed Aug. 4, 2020, which is hereby incorporated by reference herein as if set forth in its entirety.

BACKGROUND

1. Technical Field

The present disclosure relates to robot technology, and particularly to a robot posture control method as well as a robot and a computer readable storage medium using the same.

2. Description of Related Art

In the prior art, when performing posture control on a biped humanoid robot, it generally needs to model it first. The modeling methods of a robot can be divided into full dynamics model method and reduced-order model method. The full dynamics model method models all the joints and links of the robot. It also plans the motion and output force of each joint driven by an actuator. The reduced-order model method includes linear inverted pendulum with massless beam (LIP) model, spring-loaded inverted pendulum (SLIP) model, and the like. However, these reduced-order models cannot reflect all control targets of a humanoid robot, such as the center of mass (centroid), the upper-body pose and the floor inclination simultaneously. Hence, a novel reduced order virtual model which considers the control targets as mentioned is needed. The biped humanoid robot is simplified into this virtual model, and the motion control is performed on the virtual model, while the real humanoid robot realizes movements by copying the states of the virtual model.

At present, the biped humanoid robots that support full dynamics models require great computational resource and the current embodied computers can only implement the fast servo-rate (e.g., 1000 Hz) computation with significant financial and energy cost. Moreover, the full dynamics model often require force control joints, and the large-torque force control motor will directly increase the cost and the difficulty of joint control. Hence, these methods are not easy to popularize. The derivative model of the LIP model and its kinds often assume that the pendulum is fixed on the ground. It can only reflect the centroid and the support point of the robot, which makes the effectiveness and robustness of the posture control of the robot through the simplified model poorer if the robot is standing on an inclined floor.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

DETAILED DESCRIPTION

Figure 1:
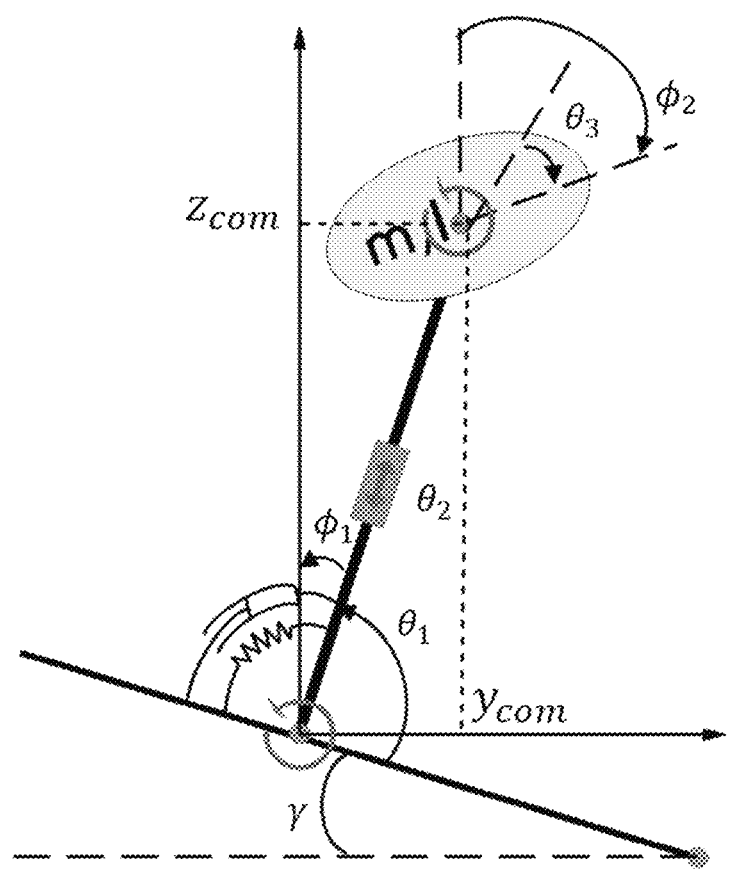
FIG. 1 is a schematic diagram of a virtual model according to an embodiment of the present disclosure.

In order to make the objects, features and advantages of the present disclosure more obvious and easier to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including" (or "comprising") indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "a," "an," and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected"

may be interpreted as "once determining" or "in response to determining" or "on detection of [the described condition or event]" or "in response to detecting [the described condition or event]".

In addition, in the present disclosure, the terms "first", "second", "third", and the like in the descriptions are only used for distinguishing, and cannot be understood as indicating or implying relative importance.

In an outdoor environment, a biped humanoid robot needs to walk steadily on high and low undulating roads and maintain its upper body posture and overall balance. If the robot is to serve on moving platforms, for example, moving vehicles such as cars, ships, and airplanes, the robot needs to maintain its upper body posture and overall balance on a bumpy floating plane. Therefore, the balance and posture control of the robot is its primary technical problem that needs to solve for the service in various complex environments built by humans. A biped humanoid robot capable of performing omnidirectional and all-terrain walking requires at least 12 degrees-of-freedom. In the above-mentioned environment, it is a great technical challenge to achieve the motion planning and control of a high degree-of-freedom and nonlinear robot and maintain its posture and balance.

From a control point of view, the maintenance of the balance and posture of the robot can be understood as that the centroid and posture of the robot are always maintained in the planned state (including position, velocity and acceleration). However, if the centroid and posture of the robot reach an unexpected state, it may lose its stableness, and the posture of the robot is not the expected posture. From a transient domain of view, the external unknown disturbance can be categorized as static disturbance, the quasi-static disturbance, and the dynamic disturbance. The unknown static disturbance can be the un-modelled or the un-measured bumpy terrain, but the terrain does not change with time, or can be a constant external force acting on the robot. The quasi-static disturbance means that the disturbance can change, but the change rate is relatively low. The dynamic disturbance means that the disturbance can change, but the change rate is high. Some balance and posture maintenance methods can only work when the robot experiences the static and the quasi-static disturbance. It is commonly agreed that a humanoid can maintain its balance if the projection of the centroid of the robot on the ground is always within the support polygon formed by the feet. Some conventional balance maintenance methods are either the posture of the robot being mostly maintained by positional compliance, or estimating terrain undulations in front through a visual sensor, and making the sole surface of the robot to adapt to the terrain in advance. The available methods include considering the relationship between the ground reaction force, the zero moment point, and the acceleration of the centroid of the robot. The balance of the robot is controlled through the angular momentum and linear momentum, while the dynamic posture maintenance of the robot can be realized through feedback control. The balance of the robot is controlled through the angular momentum and linear momentum, while the dynamic posture maintenance of the robot can be realized through feedback control. However, when the robot suffers dynamic external disturbance, especially if the robot is a position-controlled robot with high stiffness, the above-mentioned methods do not perform well.

In the embodiments of the present disclosure, based on the technical scheme of the reduced-order model method, a virtual model based on an included angle between a sole of the robot and a horizontal plane. A momentum wheel inverted pendulum model obtained by simplifying the robot itself is provided, which reflects the posture of the upper body of the robot and the postures of the feet of the robot. In addition, based on this virtual model, an inertial measurement unit (IMU) is used to estimate the position of the included angle between the sole of the robot and the horizontal plane to realize static balance and posture maintenance. Furthermore, through inner-loop external disturbance rejection control in velocity level based on null space, dynamic balance and position maintenance are realized. Still furthermore, through the estimation of acceleration, the complete constraints on the centroid and posture of the robot are realized. Finally, through the positional closed loop, the stability of the system of the robot is improved, and a control system framework that can maintain the balance and posture of the robot is realized.

In order to be able to simultaneously control the centroid and the posture of the robot, the virtual model of the robot can be constructed first, so that the model can reflect the states of the two controlled objectives (i.e., the centroid and the posture). FIG. 1 is a schematic diagram of a virtual model according to an embodiment of the present disclosure. In the embodiments of the present disclosure, a virtual model as shown in FIG. 1 is constructed first. As can be seen from the figure, the virtual model is composed of an included angle between a sole of a foot of a robot and a horizontal plane and momentum wheel inverted pendulum model obtained by simplifying the robot itself, where the robot is a biped robot have two legs (i.e., a left leg and a right leg), for example, a robot shown in FIG. 11. In which, the movement of the legs or other limbs (e.g., hand, arm, and head) of the robot is realized by joints connected there, where a servo driven by a motor is installed on each joint, and the movement of the limbs is realized by the motor rotating an output shaft of the servo which is connected to the limb. In addition, the momentum wheel inverted pendulum of the prior art uses a fixed base, but the momentum wheel inverted pendulum of the above-mentioned momentum wheel inverted pendulum model uses a floating base and adds additional degrees of freedom to form redundancy, which realizes disturbance rejection by null space method through artificial redundancy.

Figure 2:
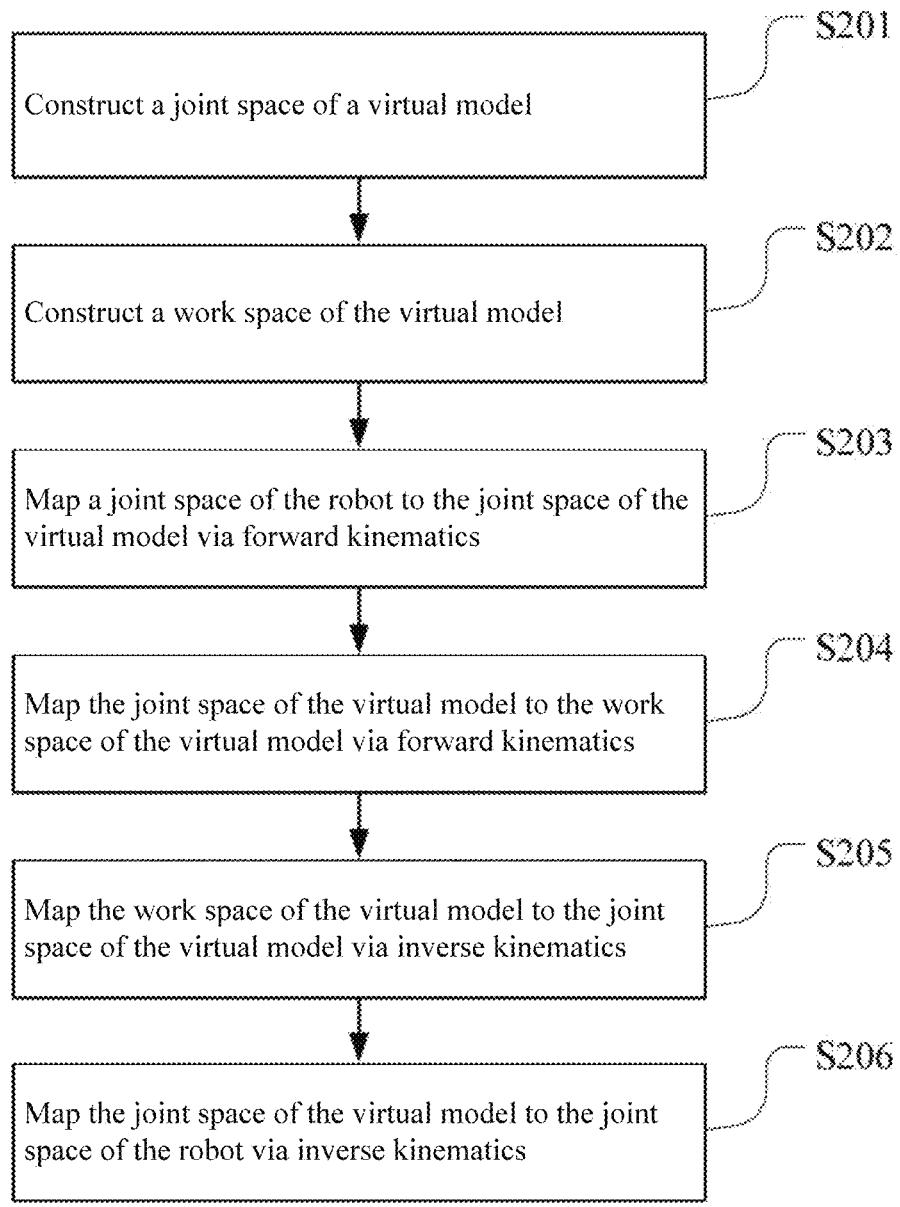
FIG. 2 is a flow chart of constructing a virtual model of a robot according to an embodiment of the present disclosure.

FIG. 2 is a flow chart of constructing a virtual model of a robot according to an embodiment of the present disclosure. As shown in FIG. 2, the construction of a virtual model includes the following steps.

S201: constructing a joint space of a virtual model.

In this embodiment, a coordinate vector of the joint space of the virtual model can be constructed according to the following formula:

$$\Theta=[\theta_1,\theta_2,\theta_3,\gamma]^T; \qquad (1)$$

where, $\theta_1$ is an included angle (or the rotational primitive) between the inverted massless beam of the virtual model and a sole surface of the robot, $\theta_2$ is the translational primitive of the inverted massless beam of the virtual model, and $\theta_3$ is an included angle between the momentum wheel of the virtual model and the inverted massless beam, $\gamma$ is an included angle between the sole surface of the virtual model and a horizontal plane, and $\Theta$ is the coordinate vector of the joint space of the virtual model.

S202: constructing a work space of the virtual model.

The purpose of constructing the virtual model lies in the two control objectives of the centroid state and the posture state. Therefore, the work space of the virtual model can be defined mainly for these two control objectives. In this embodiment, a coordinate vector of the work space of the virtual model is constructed according to the following formula:

$$\Phi = [\varphi_1, \varphi_2, y_{com}, z_{com}]^T; \quad (2)$$

where, $\varphi_1$ is an included angle between the inverted massless beam of the virtual model and the z-axis of a Cartesian coordinate system, $\varphi_2$ is the posture of the momentum wheel of the virtual model in the Cartesian coordinate system, and $y_{com}$ and $z_{com}$ are the positions of the centroids of the virtual model in the Cartesian coordinate system, $\Phi$ is the coordinate vector of the work space of the virtual model.

It is worth noting that, if it needs to control the state of the posture, the information of $\varphi_2$ can be directly used. If it needs to control the state of the centroid, either $y_{com}$ and $z_{com}$ can be directly used, or the centroid can be controlled by controlling the states of $\varphi_1$ and $\theta_2$, because there is a relationship shown in formulas (3a) and (3b):

$$z_{com} = \theta_2 \sin(\varphi 1); \text{ and} \quad (3a)$$

$$y_{com} = \theta_2 \cos(\varphi 1). \quad (3b)$$

In terms of quality attributes, the masses of the links of the robot can be summed up to form the mass of the momentum wheel, as shown in formula (4):

$$M = \sum_{i=1}^{n} m_i; \quad (4)$$

where, M is the mass of the momentum wheel, n is the number of the joints of the robot, and $m_i$ is the mass of the joint i ($1 \leq i \leq n$) of the robot.

The position of the centroid of the simplified momentum wheel inverted pendulum can be calculated based on the fitted centroid formula which, taking the y-axis as an example, is as shown in formula (5):

$$y_{com} = \frac{\sum_{i=1}^{n} m_i y_i}{M}; \quad (5)$$

where, $y_i$ is the coordinate of the centroid of the joint i of the robot.

The inertia of the simplified momentum wheel inverted pendulum can be obtained through the parallel axis theorem by shifting the inertia of each joint of the robot to the centroid coordinate system so as to add up as follows:

$$I = \sum_{i=1}^{n} I_{ci}; \quad (6)$$

where, $I_{ci}$ is the inertia tensor matrix after the inertia tensor matrix of the joint i is shifted to the fitted centroid. In which, the shifting method of the inertia moment which, taking the y-axis as an example, is as shown in formula (7):

$$I_{ci}^{yy} = I_{gi}^{yy} + m_i(x_i^2 + z_i^2); \quad (7)$$

where, $I_{gi}$ is the inertia tensor of the joint i of the robot centered on the centroid and aligned with each axis of the Cartesian coordinate system, the superscript yy represents the y-axis moment of inertia, and $x_i$ is the distance in the x direction from the centroid of the joint i of the robot to the fitted centroid, and $z_i$ is the distance in the z direction from the centroid of the joint i of the robot to the fitted centroid.

The shifting method of the product of inertia which, taking the xy axis as an example, is as shown in formula (8):

$$I_{ci}^{xy} = I_{gi}^{xy} + m_i x_i y_i; \quad (8)$$

where, the superscript xy represents the product of inertia of the x-axis and the y-axis, and $y_i$ represents the distance in the y direction from the centroid of the joint i of the robot to the fitted centroid.

S203: mapping a joint space of the robot to the joint space of the virtual model via forward kinematics.

Figure 3:
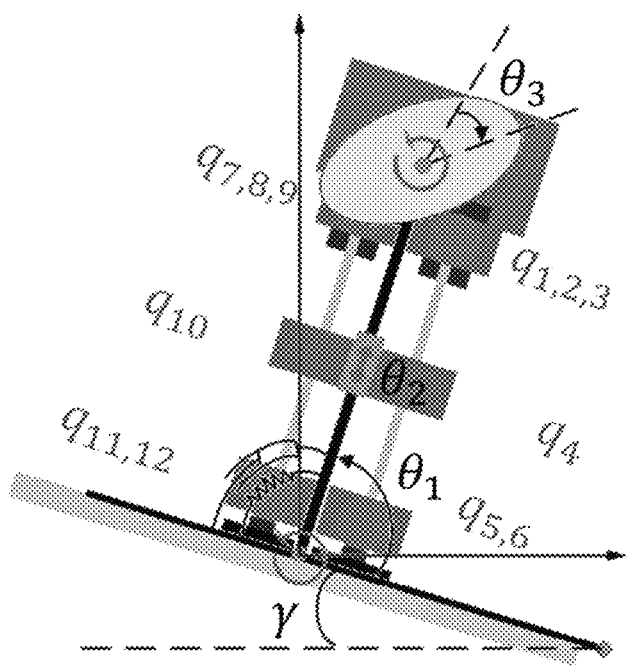
FIG. 3 is a schematic diagram of a joint space of the robot and a joint space of the virtual model according to an embodiment of the present disclosure.

To realize the simplification from the joint space of the real 12-DOF biped robot to the joint space of the virtual model, a forward kinematics mapping algorithm is required. FIG. 3 is a schematic diagram of a joint space of the robot and a joint space of the virtual model according to an embodiment of the present disclosure. As shown in FIG. 3, taking the general bipedal humanoid robot that can walk omnidirectionally as an example, it is assumed that it has 12 degrees of freedom. In which, the hip joint of each leg has three degrees of freedom RZ, RX, and RY, the knee joint has one degree of freedom RY, and the ankle joint has two degrees of freedom RY and RX, then the coordinate vector of the joint space of the robot can be expressed as:

$$Q = [q_1 q_2 \ldots q_{12}]^T; \quad (9)$$

where, Q is the coordinate vector of the joint space of the robot, and $q_1, q_2, \ldots, q_{12}$ are the components of Q in 12 degrees of freedom, respectively.

For the point in the Cartesian coordinate system, a homogeneous transformation matrix is used to describe its pose, as shown in formula (10):

$$P = \begin{bmatrix} R & p \\ 0 & 1 \end{bmatrix} = \begin{bmatrix} \begin{bmatrix} r^{1,1} & r^{1,2} & r^{1,3} \\ r^{2,1} & r^{2,2} & r^{2,3} \\ r^{3,1} & r^{3,2} & r^{3,3} \end{bmatrix} & \begin{bmatrix} p_x \\ p_y \\ p_z \end{bmatrix} \\ [0 \ 0 \ 0] & 1 \end{bmatrix}; \quad (10)$$

where, P is the pose of a certain point in the space, $R \in \mathbb{R}^{3 \times 3}$ represents the posture of the point, and $p \in \mathbb{R}^{3 \times 1}$ represents the position of the point. Assuming that the included angle $\theta_3$ between the momentum wheel and the pendulum is only related to the posture of the waist of a given robot, according to the rotational sequence specified by RPY (i.e., roll, pitch, and yaw), the rotation matrix of the included angle $\theta_3$ can be expressed as:

$$R_{wheel} = \begin{bmatrix} \cos(\theta_{3,pitch}) & 0 & \sin(\theta_{3,pitch}) \\ 0 & 1 & 0 \\ -\sin(\theta_{3,pitch}) & 0 & \cos(\theta_{3,pitch}) \end{bmatrix} \begin{bmatrix} 1 & 0 & 0 \\ 0 & \cos(\theta_{3,roll}) & -\sin(\theta_{3,roll}) \\ 0 & \sin(\theta_{3,roll}) & \cos(\theta_{3,roll}) \end{bmatrix} = \quad (11)$$

-continued $$\begin{bmatrix} \cos(\theta_{3,pitch}) & \sin(\theta_{3,pitch})\sin(\theta_{3,roll}) & \sin(\theta_{3,pitch})\cos(\theta_{3,roll}) \\ 0 & \cos(\theta_{3,roll}) & -\sin(\theta_{3,roll}) \\ -\sin(\theta_{3,pitch}) & \cos(\theta_{3,pitch})\sin(\theta_{3,roll}) & \cos(\theta_{3,pitch})\cos(\theta_{3,roll}) \end{bmatrix} = R_{waist};$$

where, the subscript wheel represents the posture of the momentum wheel, the subscript waist represents the given posture of the waist, the subscript roll represents the roll direction, and the subscript pitch represents the pitch direction. According to formula (11), the value of $\theta_{3,roll}$ can be determined according to the second element in the second row (i.e., $r_{waist}^{2,2}$) and the third element in the second row (i.e., $r_{waist}^{2,3}$) of $R_{wheel}$, and the value of $\theta_{3,pitch}$ can be determined according to the first element in the first row (i.e., $r_{waist}^{1,1}$) and the first element in the third row (i.e., $r_{waist}^{3,1}$) of $R_{wheel}$, as shown in the following formulas:

$$\theta_{3,roll}=\text{atan } 2(-r_{waist}^{2,3},r_{waist}^{2,2}); \text{ and} \quad (12a)$$

$$\theta_{3,pitch}=\text{atan } 2(-r_{waist}^{3,1},r_{waist}^{1,1}) \quad (12b)$$

It should be noted that, only the roll and pitch directions are considered here. If there is a yaw direction for a given waist posture, the $R_{waist}$ needs to be multiplied by the transpose of the yaw directional transformation matrix ($R_{waist}^{yaw}$) before it, as shown in the following formula:

$$R'_{waist}=(R_{waist}^{yaw})^T R_{waist} \quad (13)$$

Using the posture $R_{imu}$ and position $p_{imu}$ measured by the IMU, the forward kinematics algorithm from the waist to the sole can be used to calculate the joint spaces $\gamma$, $\theta_1$ and $\theta_2$ of the virtual model.

First, the poses $P_L$ and $P_R$ of the left and right legs, respectively, are calculated through the kinematic chain. Taking the left leg as an example, as shown in the following formula:

$$P_L = \begin{bmatrix} R_{imu} & p_{imu} \\ 0 & 1 \end{bmatrix} \prod_{i=1}^{k} \begin{bmatrix} R_{i,L} & p_{i,L} \\ 0 & 1 \end{bmatrix} = \begin{bmatrix} R_{foot,L} & p_{foot,L} \\ 0 & 1 \end{bmatrix}; \quad (14)$$

where, $R_{i,L}$ represents the rotation matrix of joint i, and $p_{i,L}$ represents the spatial position of joint i.

Figure 4:
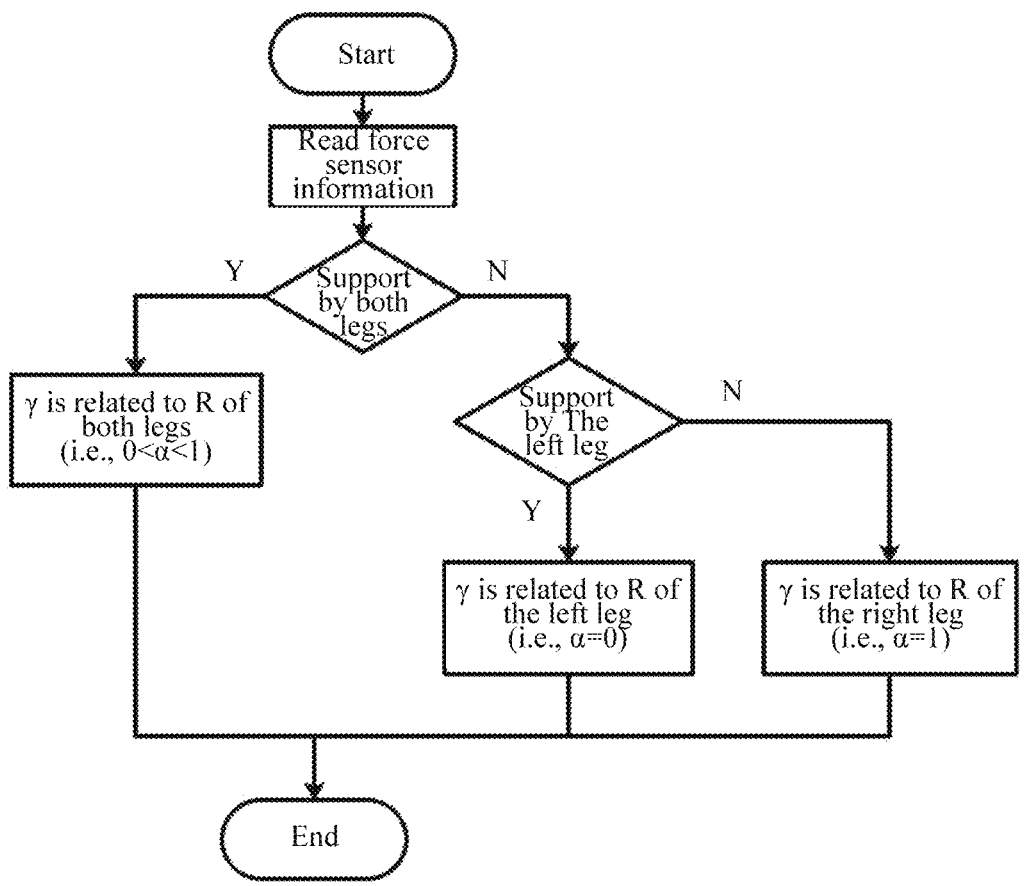
FIG. 4 is a flow chart of determining a joint angle of a virtual model; according to an embodiment of the present disclosure.

FIG. 4 is a flow chart of determining a joint angle of a virtual model; according to an embodiment of the present disclosure. In a servo step, 6-axis force sensors installed on both feet are read. If both sensors on both feet have none-zero readings, it considers that the robot is supported by both legs, the factor $\alpha$ is determined by the ratio of the readings. If one sensor has zero reading, then it considers that the robot is supported by one leg, and the factor $\alpha$ is either 0 or 1 depending on which support leg it is. As shown in FIG. 2, the determining of a joint angle $\gamma$ of the virtual model is provided. In this embodiment, $\gamma_{roll}$ and $\gamma_{pitch}$ can be determined according to the support state of the left and right legs with respect to the ground:

$$\gamma_{roll}=(1-\alpha)\text{atan } 2(-r_{foot,L}^{2,3},r_{foot,L}^{2,2})+\alpha\text{atan } 2(-r_{foot,R}^{2,3},r_{foot,R}^{2,2}); \text{ and} \quad (15a)$$

$$\gamma_{pitch}=(1-\alpha)\text{atan } 2(-r_{foot,L}^{3,1},r_{foot,L}^{1,1})+\alpha\text{atan } 2(-r_{foot,R}^{3,1},r_{foot,R}^{1,1}); \quad (15b)$$

where, $\alpha$ is a real number between 0 and 1, which is related to planning.

Then, $\theta_2$ can be calculated according to the position p in formula (14). At this time, a also needs to be used and the determination process is similar to the procedure as shown in FIG. 4, as the following formula:

$$\theta_2 = \sqrt{((1-\alpha)p_{s,L}+\alpha p_{x,R})^2((1-\alpha)p_{y,L}+\alpha p_{y,R})^2+((1-\alpha)p_{z,L}+\alpha p_{z,R})^2} \quad (16)$$

Finally, $\theta_1$ is determined through several rotation matrices as follows:

$$R_{root}=R_{foot}{}^r R_{imu} R_{wheel}^T \quad (17)$$

Then, $\theta_1$ is solved in a similar way to formula (12).

S204: mapping the joint space of the virtual model to the work space of the virtual model via forward kinematics.

The forward kinematics algorithm from the joint space of the virtual model to the work space of the virtual model also needs to be implemented through a rotation matrix. First, the rotation matrix of $\phi_1$ can be expressed as:

$$R_{\phi_1}=R_{foot} R_{root} \quad (18)$$

Similarly, the rotation matrix of $\phi_2$ can be obtained, for example:

$$R_{\phi_2}=R_{\phi_1} R_{wheel} \quad (19)$$

Then, in a similar way to formulas (12a) and (12b), the respective angles can be obtained through the function a tan2( ). The position of the centroid can be obtained based on formulas (3a) and (3b).

S205: mapping the work space of the virtual model to the joint space of the virtual model via inverse kinematics.

After the state control of the centroid and posture is performed in the work space of the virtual model, the reference value needs to be returned to the joint space of the virtual model, and then further mapped to the joint space of the real robot. The inverse kinematics algorithm from the work space of the virtual model to the joint space of the virtual model is the inverse of each formula in step S204. The rotation matrix of $\theta_3$ can be expressed as:

$$R_{wheel}=R_{\phi_2} R_{\phi_1}^T \quad (20)$$

The rotation matrix of the joint angle $\theta 1$ of the virtual model can be expressed as:

$$R_{root}=(R_{foot}^T R_{\phi_1})^T = R_{\phi_1}^T R_{foot} \quad (21)$$

The joint angle $\theta_2$ of the virtual model is the distance from the fulcrum to the centroid, and $\gamma$ is generally uncontrollable.

S206: mapping the joint space of the virtual model to the joint space of the robot via inverse kinematics.

Figure 5:
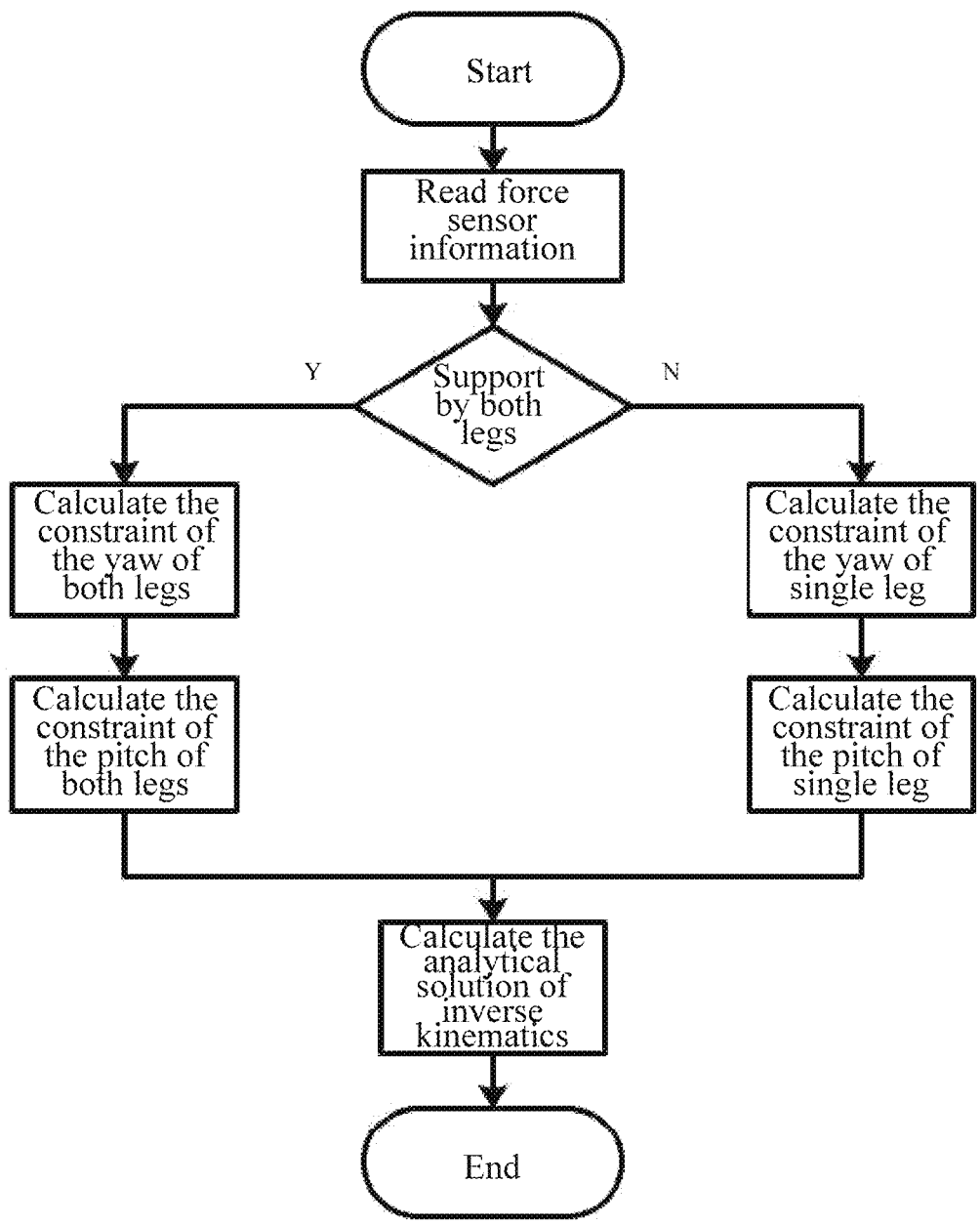
FIG. 5 is a flow chart of mapping a joint space of a virtual model to a joint space of a robot according to an embodiment of the present disclosure.
Figure 6:
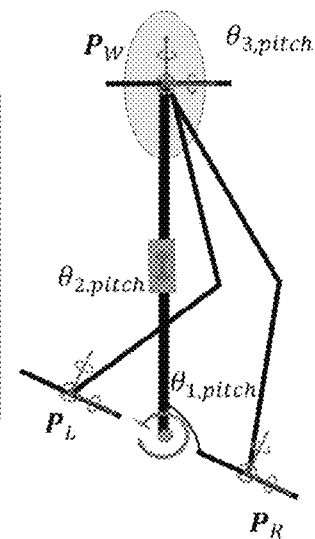
FIG. 6 is a schematic diagram of an example the yaw directional constraint when the robot is supported by both legs according to an embodiment of the present disclosure.

FIG. 5 is a flow chart of mapping a joint space of a virtual model to a joint space of a robot according to an embodiment of the present disclosure. Similar to the forgoing descriptions for FIG. 4, in a servo step, the readings of force sensors are used to determine if the robot is supported by one leg or both legs. If the robot is supported by both legs, the constraints depicted in FIG. 6 are calculated with the information (e.g., joint angles) of both legs. If the robot is supported by both legs, the constraints depicted in FIG. 6 are calculated with the information (e.g., joint angles) of the supporting leg. Then the calculation of inverse kinematics is applied. As shown in FIG. 5, the inverse kinematics mapping algorithm from the joint space of the virtual model to the joint space of the real 12-DOF biped robot is the inversion of step S203.

First, the relative postures of the waist and legs can be determined according to the rotation matrix of $\theta_1$ and $\theta_3$, for example:

$$R_L = R_{waist} R_{foot,L}^T; \text{ and} \quad (22a)$$

$$R_R = R_{waist} R_{foot,R}^T \quad (22b)$$

Then, the length of the legs is determined through $\theta_2$ and $\alpha$, and finally the work space parameters of the real robot are obtained to substitute into the analytical solution of inverse kinematics to obtain 12 joint angles. It should be noted that, to map from a low-dimensional space to a high-dimensional space, geometric constraints are needed. Otherwise, it is impossible to get a unique solution of the inverse kinematics. FIG. 6 is a schematic diagram of an example the yaw directional constraint when the robot is supported by both legs according to an embodiment of the present disclosure. As shown in FIG. 6, an example of the yaw directional constraint when the robot is supported by both legs is provided.

After the virtual model is constructed, posture controls can be performed on the robot based on the virtual model.

When the sole surface of the robot is parallel to the plane (e.g., the flat ground and slope) on which the robot stands, it can be considered that the joint angle $\gamma$ of the virtual model is the inclination angle of the plane on which the robot stands. It can estimate the inclination angle of the plane on which the robot stands through formulas (15a) and (15b) through the IMU.

By obtaining the position on the ground, it facilitates achieving the static balance of the robot on the inclined plane. Herein, the relative movement velocity of the robot on the plane where the robot stands can also be estimated through the IMU. The inclination angle of the plane calculated above is also the angle of the rotational sequence of RPY. After respectively obtaining the pitch angle and the yaw angle, the yaw angular velocity and the pitch angular velocity can be obtained using differentiation, for example:

$$\dot{\gamma}_{roll}(s) = \frac{s}{cs+1} \gamma_{roll}(s); \text{ and} \quad (22c)$$

$$\dot{\gamma}_{pitch}(s) = \frac{s}{cs+1} \gamma_{pitch}(s); \quad (22d)$$

where, s is the s-domain transfer function after Laplace transform, and c is a non-negative real number close to 0. It should be noted that, in this embodiment, the variable is added with a point in above to represent its first-order differential, and the variable is added with two points in above to represent its second-order differential. The estimation of velocity can assist the control of dynamic balance and the posture state control.

The above-mentioned difference method has the rotational sequence of RPY, and its coordinate transformation is in the form of matrix multiplication as described above. Therefore, it has coupling properties and is disadvantageous to the calculation with the subsequent null space and the subsequent application of null space based inner-loop disturbance rejection control strategy. In this embodiment, it can be decoupled so that the velocity can be directly linearly added instead of matrix multiplied, where the sequence of the angular velocity is changed from rotating around the x-axis first, then around the y-axis, and finally around the z-axis to rotating around a fixed absolute world (i.e., Cartesian) coordinate system. The x-axis, y-axis and z-axis rotate separately, which are independent to each other and do not affect each other. After obtaining the angular velocity of RPY, it can be decoupled through a transformation matrix as follows:

$$\begin{bmatrix} \varpi_x \\ \varpi_y \\ \varpi_z \end{bmatrix} = \begin{bmatrix} -\cos(\gamma_{pitch}) & 0 & 0 \\ 0 & 1 & 0 \\ -\sin(\gamma_{pitch}) & 0 & 1 \end{bmatrix} \begin{bmatrix} \dot{\gamma}_{roll} \\ \dot{\gamma}_{pitch} \\ 0 \end{bmatrix}; \quad (23)$$

where, $\bar{\omega}$ is the velocity of the rigid body rotating around the fixed world coordinate axis, and the subscript represents the coordinate axis.

Another method of decoupling is through the Jacobian matrix. When considering only the posture, the pitch and yaw measured by the IMU are used as the extra two degrees of freedom. The geometric Jacobian matrix (the Jacobian matrixes mentioned below are all geometric Jacobian matrixes) are calculated according to the actual joint angles, which is denoted as $J_{\bar{\omega}}$, then:

$$\begin{bmatrix} \varpi_x \\ \varpi_y \\ \varpi_z \end{bmatrix} = J_{\varpi} \begin{bmatrix} i\dot{m}u_{roll} \\ i\dot{m}u_{pitch} \\ \dot{q}_1 \\ \dot{q}_2 \\ \dot{q}_3 \\ \dot{q}_4 \\ \dot{q}_5 \\ \dot{q}_6 \end{bmatrix} \quad (24)$$

Through the forgoing method, the three-dimensional model in the space can be projected to the xz plane and the yz plane to form two mutually independent plane virtual models, which facilitates the implementation of the subsequent method.

To achieve the full state control of the control objective, in addition to the position and velocity information, it is also necessary to realize the acceleration estimation. The estimation of the relative motion acceleration of the plane on which the robot stands based on the IMU can be performed using differentiation based on the RPY velocity, and then decoupled based on formula (25):

$$\begin{bmatrix} \ddot{\varpi}_x \\ \ddot{\varpi}_y \\ \ddot{\varpi}_z \end{bmatrix} = \begin{bmatrix} \cos(\gamma_{pitch}) & 0 & 0 \\ 0 & 1 & 0 \\ -\sin(\gamma_{pitch}) & 0 & 1 \end{bmatrix} \begin{bmatrix} \ddot{\gamma}_{roll} \\ \ddot{\gamma}_{pitch} \\ 0 \end{bmatrix} + \quad (25)$$

-continued $$\begin{bmatrix} -\sin(\dot{\gamma}_{pitch}) & 0 & 0 \\ 0 & 0 & 0 \\ -\cos(\gamma_{pitch})\dot{\gamma}_{pitch} & 0 & 0 \end{bmatrix} \begin{bmatrix} \dot{\gamma}_{roll} \\ \dot{\gamma}_{pitch} \\ 0 \end{bmatrix};$$

or directly calculated through the Jacobian matrix:

$$\begin{bmatrix} \dot{\omega}_x \\ \dot{\omega}_y \\ \dot{\omega}_z \end{bmatrix} = J_{\varpi} \begin{bmatrix} i\dot{m}u_{roll} \\ i\dot{m}u_{pitch} \\ \ddot{q}_1 \\ \ddot{q}_2 \\ \ddot{q}_3 \\ \ddot{q}_4 \\ \ddot{q}_5 \\ \ddot{q}_6 \end{bmatrix} + \dot{J}_{\varpi} \begin{bmatrix} i\dot{m}u_{roll} \\ i\dot{m}u_{pitch} \\ \dot{q}_1 \\ \dot{q}_2 \\ \dot{q}_3 \\ \dot{q}_4 \\ \dot{q}_5 \\ \dot{q}_6 \end{bmatrix}; \qquad (26)$$

the kinematics equation of the robot can be expressed as:

$$\dot{X}=J\dot{q}; \qquad (27)$$

where, X represents the r-dimensional work space of the robot, and q represents the n-dimensional joint space of the robot. When r<n, the corresponding Jacobian matrix J has more columns than its rows. Therefore, there are infinite solutions to formula (27). According to the definition of null space, the null space of an n×r matrix J is all the solutions of the linear equation $J\varsigma=0$, which is denoted as:

$$\text{null}(J)=\{\varsigma: \varsigma\in\Re^r \text{ and } J\varsigma=0\} \qquad (28)$$

According to the definition of null space, if the Jacobian matrix J has a null space, and let:

$$\delta\dot{\Theta}=\text{null}(J(\Theta)); \qquad (29)$$

then:

$$J(\Theta)(\dot{\Theta}+\delta\dot{\Theta})=J(\Theta)\dot{\Theta}+J(\Theta)\delta\dot{\Theta}=\dot{\Phi}+0 \qquad (30)$$

It can be seen that, as long as the superimposed velocity of each joint meets the requirement of the basis vector of the zero-space in the joint space, it will not affect the work space. Herein, the basis vector of the null space can be obtained by performing the singular value decomposition (SVD) on the Jacobian matrix J, and then the velocity offset that meets formula (28) can be found through formula (31):

$$\dot{\Theta}_n = \dot{\Theta} + \delta\dot{\Theta} = [\dot{\theta}_1 + \delta\dot{\theta}_1 \; \dot{\theta}_2 + \delta\dot{\theta}_2 \; \dot{\theta}_3 + \qquad (31)$$

$$\delta\dot{\theta}_3 \; \dot{\gamma}] = \left[\dot{\theta}_1 + \frac{\aleph_1}{\aleph_\gamma}\dot{\gamma} \; \dot{\theta}_2 + \frac{\aleph_2}{\aleph_\gamma}\dot{\gamma} \; \dot{\theta}_3 + \frac{\aleph_3}{\aleph_\gamma}\dot{\gamma} \; \dot{\gamma}\right];$$

where $\aleph$ represents the basis vector of the null space.

In this embodiment, it can use the redundancy of the joint angle γ and the included angle $\theta_1$ of the virtual model to the workspace $\phi_1$, and adjust the velocity of the included angle $\theta_1$ so that the adjusted velocity and the velocity of the joint angle γ can meet the definition of the null space, so that the velocity of $\phi_1$ is not affected by the velocity change of the joint angle γ, that is, the state of the centroid is not affected by the velocity change of the joint angle γ. In this way, the inner-loop disturbance rejection control strategy for the centroid velocity in the null space can be realized.

Figure 7:
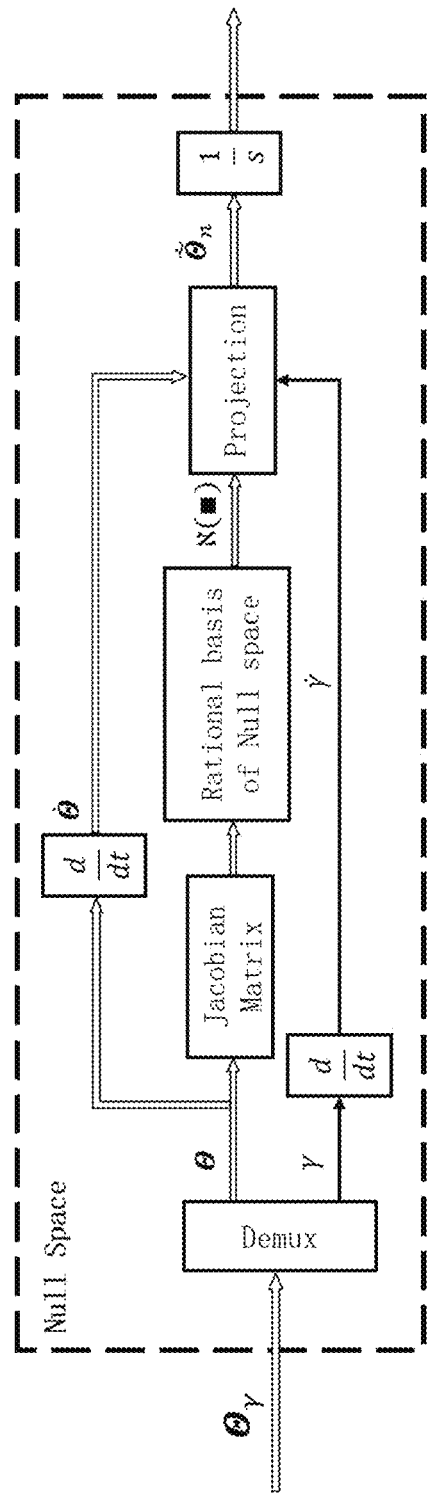
FIG. 7 is a schematic block diagram of an inner-loop disturbance rejection control for a null space according to an embodiment of the present disclosure.

FIG. 7 is a schematic block diagram of an inner-loop disturbance rejection control for a null space according to an embodiment of the present disclosure. As shown in FIG. 7, a loop anti-disturbance control for a null space includes decoupling the joint variation Θγ (denoted as the first joint variation) of the joint space of the virtual model to obtain a horizontal plane included angle variation γ and a joint angle variation Θ; calculating a basis vector $\aleph$ of a null space of the joint angle variation using a preset Jacobian matrix; and calculating a joint control compensate angle $\dot{\Theta}_n$ of the joint space of the virtual model according to the horizontal plane included angle variation, the joint angle variation, and the basis vector of the null space using formula (31).

Furthermore, in this embodiment, it can use the redundancy of the work space $\phi_1$ of the virtual mode to the work space $\phi_2$ or the redundancy of the joint spaces γ, $\theta_1$ and $\theta_3$ to the work space $\phi_2$ to adjust the velocity of $\theta_3$ so that the adjusted velocity and the velocities of γ and $\theta_1$ meet the definition of the null space, which realizes that the velocity of $\phi_2$ will not be affected by the velocity changes of γ and $\theta_1$, that is, the state of the centroid will not be affected by the velocity change of γ. In this way, an inner-loop disturbance rejection control strategy for the posture velocity in the null space can be realized.

The force exerted by the robot on the ground through the foot and the force exerted by the ground on the foot of the robot are opposite to each other. Through the change of the acceleration of the centroid, the external force received by the robot can be estimated. According to Newton's law, the acceleration of the movement of the object meets the following formula:

$$F_c+F_d=ma; \qquad (32)$$

where, the subscript c represents the unknown external force, and the subscript d represents the known planned force.

The planned moment generated by the known planned force meets the following formula:

$$F_d=ma_d \qquad (33)$$

Through the estimated acceleration information $a_m$, the external force $F_c$ can be further estimated:

$$F_c=m(a_m-a_d) \qquad (34)$$

In robotics, the mapping of the force from the joint space to the work space can be realized by Jacobian matrix, as shown in the following formula:

$$\tau_c=J^T F_c \qquad (35)$$

Therefore, if the joint of the robot is less than the planned torque $\tau_d$ by the torque of $\tau_c$, the influence of the external force $F_e$ can be offset. A force control robot can directly send joint torques as instructions to the robot joint, while the position control joints need to use an admittance operator to convert force instructions into position instructions first to send to the position control joints for execution.

Figure 8:
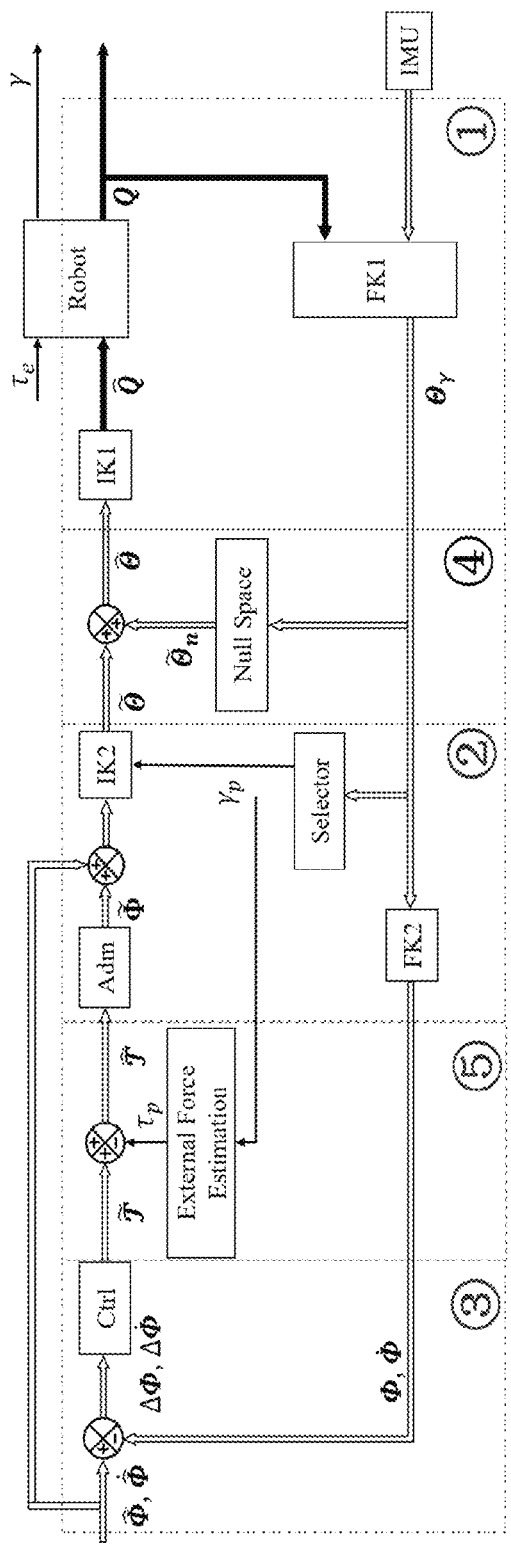
FIG. 8 is a schematic block diagram of a control framework according to an embodiment of the present disclosure.

FIG. 8 is a schematic block diagram of a control framework according to an embodiment of the present disclosure. As shown in FIG. 8, based on the forgoing algorithm, the respective modules are formed and combined to form a virtual model based robot balance and posture control framework that performs the posture control based on outer-loop feedback control, inner loop compensation for the external disturbance rejection in position level, inner loop external disturbance rejection via null-space in velocity level, and inner loop external disturbance rejection in force/ acceleration level on the robot. The block Robot represents a humanoid robot, and it is disturbed by an unknown disturbance force $\tau_e$, and the $\gamma$ is the un-expected displacement resulted by the force $\tau_e$. The module FK1 maps the real joint angle Q and the readings of IMU to the virtual model's joint angle $\Theta_\gamma$, and at the meanwhile, the un-expected displacement $\gamma$ is estimated and is denoted as $\gamma_p$. The virtual model's joint angle $\Theta_\gamma$ is then applied to the Null Space module to compute the compensate velocity for the change of $\gamma_p$ via the null-space approach, and the corresponding change of the virtual joint angles are denoted as $\tilde{\Theta}_n$. Then, the block Selector use the angle $\gamma_p$ only for position compensation through the module IK2. And the virtual angles are applied to the module FK2 to compute the work space position and orientation states $\Phi$ and $\dot{\Phi}$. They are the measured value for work space feedback control, which is depicted as the block Ctrl. The control force $\tilde{\mathcal{F}}$ and the compensation force $\tau_e$ are transformed to position $\tilde{\Phi}$ via an admittance operation block Adm, since only position command can be send to a position-controlled robot. All control reference are applied to the module IK2 and the module IK1, and they are transformed as real joint angle reference values, and then are sent to the actuators for execution.

Figure 9:
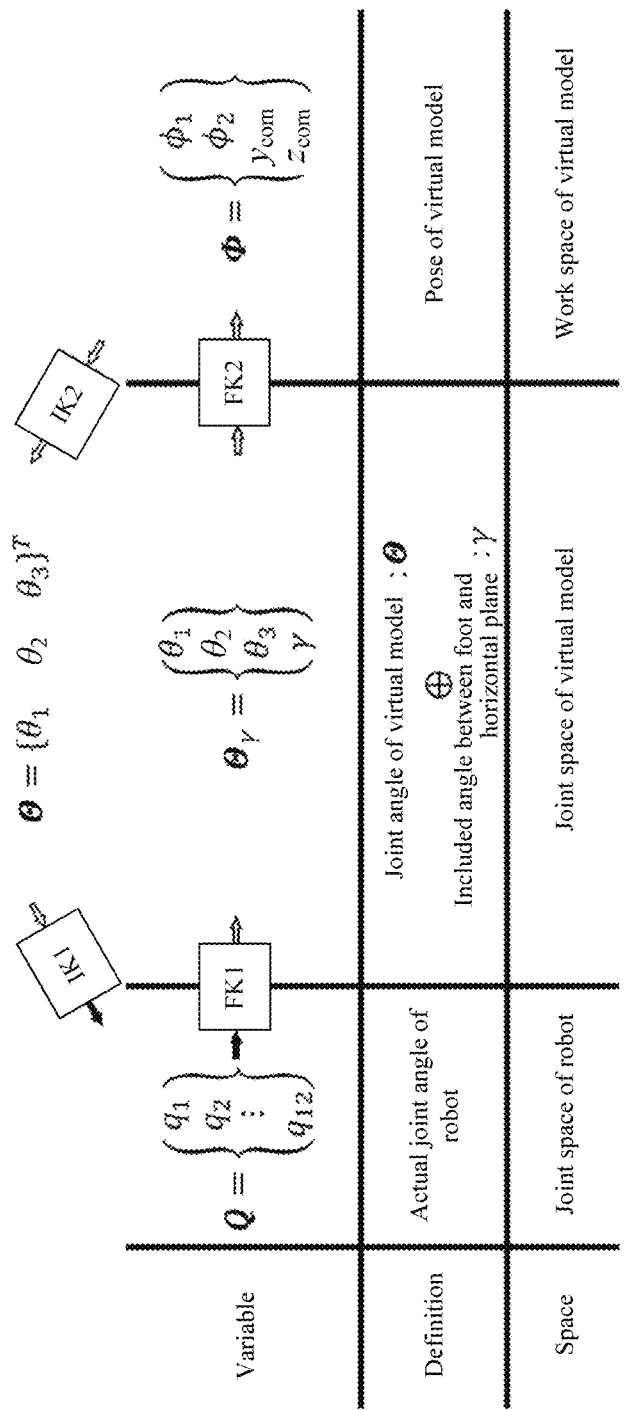
FIG. 9 is a schematic diagram of the meanings and transformation relationships of coordinate systems according to an embodiment of the present disclosure.

FIG. 9 is a schematic diagram of the meanings and transformation relationships of coordinate systems according to an embodiment of the present disclosure. The relationship between Q, $\Theta$, and $\Phi$ in FIG. 8 is shown in FIG. 9.

As shown in FIG. 8, the closed-loop feedback control is performed in the work space $\Phi$ of the virtual model. The control objective realized by designing the feedback controller is as shown in formula (36):

$$\text{when } \forall \gamma \neq 0 \text{ or } \forall \dot{\gamma} \neq 0 \text{ or } \forall \ddot{\gamma} \neq 0, \Phi = \tilde{\Phi} \text{ and } \dot{\Phi} = \dot{\tilde{\Phi}} \qquad (36)$$

That is, for the all influence of any external disturbances, which can be position, velocity, acceleration and/or their combinations, the actual centroid state of the robot and the posture state always remain consistent with its corresponding planned state. In which, the symbol ⌒ represents the planned value, and the symbol ~ represents the control instruction.

As shown in FIG. 8, in the process of controlling the robot, a control force $\tilde{\mathcal{F}}$ is outputted through a preset closed-loop feedback controller Ctrl; the control force $\tilde{\mathcal{F}}$ is transformed into a reference pose $\tilde{\Phi}$ of the workspace of the virtual model through a preset admittance operator Adm; the reference pose $\tilde{\Phi}$ is transformed into a first joint reference value $\tilde{\Theta}$ of the joint space of the virtual model through a preset second reverse mapping module IK2, where the preset second reverse mapping module IK2 realizes the forgoing inverse kinematics algorithm from the workspace of the virtual model to the joint space of the virtual model; the first joint reference value is transformed into a second joint reference value $\hat{Q}$ of the joint space of the robot through a preset first reverse mapping module IK1, where the preset first reverse mapping module IK1 realizes the forgoing inverse kinematics algorithm from the joint space of the virtual model to the joint space of the robot; and the posture control is performed on the robot according to the second joint reference value.

In this embodiment, an inner loop feedback control for external disturbance rejection in position level is performed through a preset null space module Null Space, that is, the process shown in FIG. 7 is realized; an external force estimation is performed through a preset external force estimation module External Force Estimator to offset an external disturbance in force/acceleration level; a waist posture variation of the robot is measured through a preset inertial measurement unit IMU (e.g., the above-mentioned IMU); the waist posture variation of the robot is transformed into a first joint variation of the joint space of the virtual model through a preset first forward mapping module FK1; and the first joint variation is transformed into a second joint variation of the work space of the virtual model through a preset second forward mapping module FK2, where FK2 realizes the forgoing forward kinematics algorithm from the joint space of the virtual model to the work space of the virtual model. The use of the IK2 module and the external force estimation module needs to estimate the posture of the sole with respect to the space, and the separation module Selector is only used to separate the $\gamma_p$ signal from the vector $\Theta_\gamma$.

In this way, the disturbance of the external position state and external force acting on the robot is estimated, and by using the inner-loop disturbance rejection strategy related to the null space, the admittance, and the like are used to reduce the sensitivity of the centroid and position state of the robot to the outside world through the inner loop control, while improves the stability of the outer loop position feedback closed-loop control system, and improves the response of the robot to external disturbance offset actions.

In summary, in this embodiment, by constructing a virtual model of the robot, where the virtual model includes a momentum wheel inverted pendulum model of the robot and an angle between a sole surface of the robot and a horizontal plane; and performing a posture control based on outer-loop feedback control, inner loop compensation for the external disturbance rejection in position level, inner loop external disturbance rejection via null-space in velocity level, and inner loop external disturbance rejection in force/acceleration level on the robot, a brand-new virtual model is provided. Based on the momentum wheel inverted pendulum model of the robot, the consideration of the included angle between the sole of the robot and the horizontal plane is added. From the perspective of model, the virtual model can fully reflect the upper body posture, centroid, foot posture, and the like of the robot which are extremely critical elements for the balance and posture control of the robot. Based on this virtual model, by performing the outer-loop feedback control, inner loop compensation for the external disturbance rejection in position level, inner loop external disturbance rejection via null-space in velocity level, inner loop external disturbance rejection in force/acceleration level on the robot, and the like on the robot, the complete constraints on the centroid and posture of the robot are realized, and a control system framework that can maintain the balance and posture of the robot is realized, which has better control effects and robustness. In comparison with the disturbance rejection method in the prior art that has the disadvantage of low response efficiency to disturbance rejection since its disturbance estimation is realized at the position level, the above-mentioned disturbance rejection method realizes a dynamic disturbance rejection strategy through null space by realizing its disturbance estimation at the velocity and acceleration level, and using the homogeneous transformation matrix in the disturbance estimation at the position level that is simple in calculation and easy to understand than in the prior art which projects the angle to two mutually orthogonal planes.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 10:
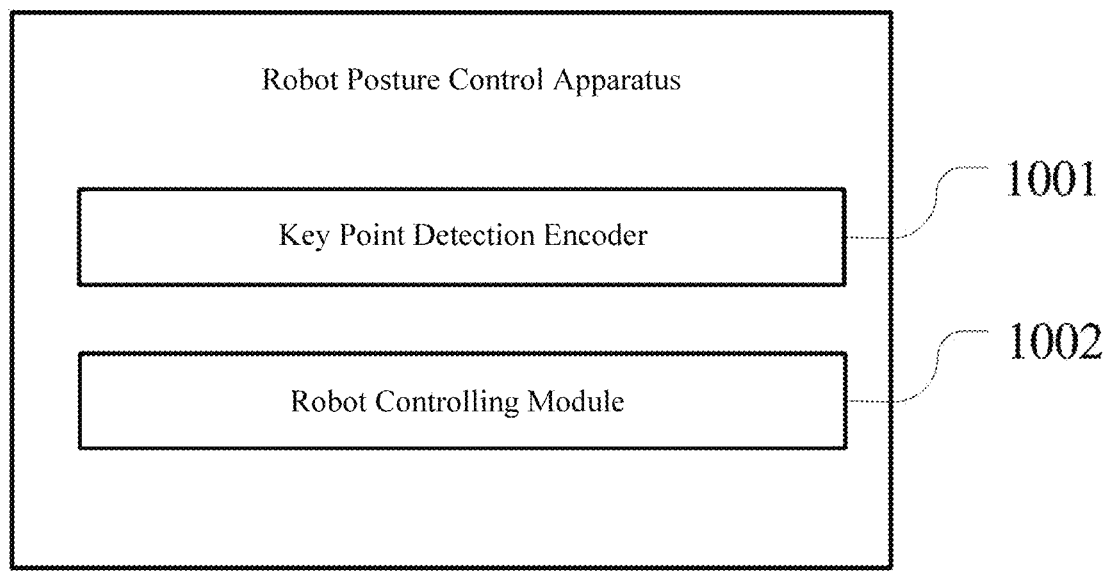
FIG. 10 is a schematic diagram of a robot posture control apparatus according to an embodiment of the present disclosure.

FIG. 10 is a schematic diagram of a robot posture control apparatus according to an embodiment of the present disclosure. As shown in FIG. 10, a posture control apparatus for a robot is provided, which corresponds to the posture control method described in the above-mentioned embodiment.

In this embodiment, the posture control apparatus includes:

a virtual model constructing module 1001 configured to construct a virtual model of the robot, where the virtual model includes a momentum wheel inverted pendulum model of the robot and an angle between a sole surface of the robot and a horizontal plane; and a robot controlling module 1002 configured to perform a posture control based on outer-loop feedback control, inner loop compensation for the external disturbance rejection in position level, inner loop external disturbance rejection via null-space in velocity level, and inner loop external disturbance rejection in force/acceleration level on the robot.

Furthermore, the virtual model constructing module 1001 includes:

a space constructing sub-module configured to construct a joint space and a work space of the virtual model;

a first mapping relationship constructing sub-module configured to map a joint space of the robot to the joint space of the virtual model via forward kinematics;

a second mapping relationship constructing sub-module configured to map the joint space of the virtual model to the workspace of the virtual model via forward kinematics;

a third mapping relationship constructing sub-module configured to map the workspace of the virtual model to the joint space of the virtual model via inverse kinematics; and a fourth mapping relationship constructing sub-module configured to map the joint space of the virtual model to the joint space of the robot via inverse kinematics.

Furthermore, the robot controlling module 1002 includes:

a control force outputting sub-module configured to output a control force through a preset closed-loop feedback controller;

a first transforming sub-module configured to transform the control force into a reference pose of the workspace of the virtual model through a preset admittance operator;

a second transforming sub-module configured to transform the reference pose into a first joint reference value of the joint space of the virtual model through a preset second reverse mapping module;

a third transforming sub-module configured to transform the first joint reference value into a second joint reference value of the joint space of the robot through a preset first reverse mapping module; and a posture controlling sub-module configured to perform the posture controls on the robot according to the second joint reference value.

Furthermore, the robot controlling module 1002 further includes:

an inner loop feedback controlling sub-module configured to perform an inner loop feedback control for external disturbance rejection in position level through a preset null space module;

an external force offsetting sub-module configured to perform an external force estimation through a preset external force estimation module to offset an external disturbance in force/acceleration level;

a posture measuring sub-module configured to measure a waist posture variation of the robot through a preset inertial measurement unit;

a fourth transforming sub-module configured to transform the waist posture variation of the robot into a first joint variation of the joint space of the virtual model through a preset first forward mapping module; and a fifth transforming sub-module configured to transform the first joint variation into a second joint variation of the workspace of the virtual model through a preset second forward mapping module.

Furthermore, the inner loop feedback controlling sub-module further includes:

a decoupling unit configured to decouple the first joint variation to obtain a horizontal plane included angle variation and a joint angle variation;

a basis vector calculating unit configured to calculate a basis vector of a null space of the joint angle variation using a preset Jacobian matrix; and a joint control offset calculating unit configured to calculate a joint control compensate angle of the joint space of the virtual model according to the horizontal plane included angle variation, the joint angle variation, and the basis vector of the null space.

Those skilled in the art may clearly understand that, for the convenience and simplicity of description, for the specific operation process of the above-mentioned apparatus, modules and units, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Figure 11:
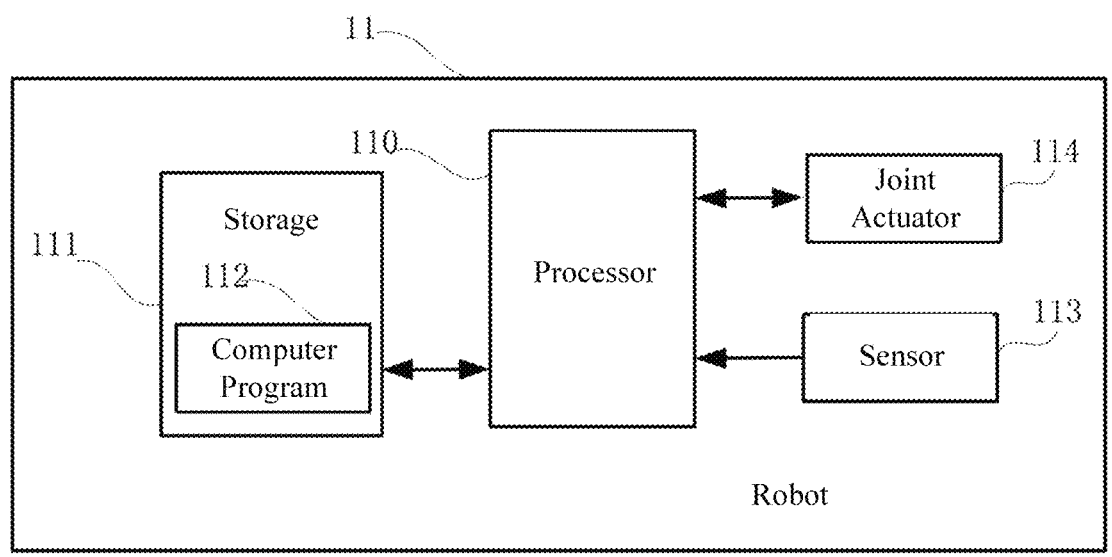
FIG. 11 is a schematic diagram of a robot according to an embodiment of the present disclosure.

FIG. 11 is a schematic diagram of a robot according to an embodiment of the present disclosure. In this embodiment, a robot 11 is provided. For ease of description, only parts related to this embodiment are shown.

As shown in FIG. 11, in this embodiment, the robot 11 includes: a processor 110, a storage 111, a computer program 112 stored in the storage 111 and executable on the processor 110, a sensor 113, and a joint actuator 114. The robot 11 is a biped robot having two legs (i.e., a left leg and a right leg). When executing (instructions in) the computer program 112, the processor 110 implements the steps in the above-mentioned embodiments of the robot posture control method. Alternatively, when the processor 110 executes (instructions in) the computer program 112, the functions of each module/unit in the above-mentioned device embodiment are implemented. The sensor 113 includes the IMU mentioned in the foregoing method embodiment, which is configured to measure the waist posture variation of the robot 11. The joint actuator 114 is configured to perform posture control on the robot 11 according to the second joint reference value mentioned in the foregoing method embodiment.

Exemplarily, the computer program 112 may be divided into one or more modules/units, and the one or more modules/units are stored in the storage 111 and executed by the processor 110 to realize the present disclosure. The one or more modules/units may be a series of computer program instruction sections capable of performing a specific function, and the instruction sections are for describing the execution process of the computer program 112 in the robot 11.

It can be understood by those skilled in the art that FIG. 11 is merely an example of the robot 11 and does not constitute a limitation on the robot 11, and may include more or fewer components than those shown in the figure, or a combination of some components or different components.

For example, the robot 11 may further include an input/output device, a network access device, a bus, and the like.

The processor 110 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 111 may be an internal storage unit of the robot 11, for example, a hard disk or a memory of the robot 11. The storage 111 may also be an external storage device of the robot 11, for example, a plug-in hard disk, a smart media card (SMC), a secure digital (SD) card, flash card, and the like, which is equipped on the robot 11. Furthermore, the storage 111 may further include both an internal storage unit and an external storage device, of the robot 11. The storage 111 is configured to store the computer program 112 and other programs and data required by the robot 11. The storage 111 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented posture control method for a robot, comprising:
   constructing a virtual model of the robot, wherein the virtual model comprises a momentum wheel inverted pendulum model of the robot and an angle between a sole surface of the robot and a horizontal plane; and performing a posture control based on outer-loop feedback control, inner loop compensation for the external disturbance rejection in position level, inner loop external disturbance rejection via null-space in velocity level, and inner loop external disturbance rejection in force/acceleration level on the robot;

wherein the step of performing the posture control based on outer-loop feedback control, inner loop compensation for the external disturbance rejection in position level, inner loop external disturbance rejection via null-space in velocity level, and inner loop external disturbance rejection in force/acceleration level on the robot comprises:

outputting a control force through a preset closed-loop feedback controller;

transforming the control force into a reference pose of the workspace of the virtual model through a preset admittance operator;

transforming the reference pose into a first joint reference value of the joint space of the virtual model through a preset second reverse mapping module;

transforming the first joint reference value into a second joint reference value of the joint space of the robot through a preset first reverse mapping module; and performing the posture controls on the robot according to the second joint reference value.

2. The method of claim 1, wherein the step of constructing the virtual model of the robot comprises:

constructing a joint space and a workspace of the virtual model;

mapping a joint space of the robot to the joint space of the virtual model via forward kinematics;

mapping the joint space of the virtual model to the workspace of the virtual model via forward kinematics;

mapping the workspace of the virtual model to the joint space of the virtual model via inverse kinematics; and mapping the joint space of the virtual model to the joint space of the robot via inverse kinematics.

3. The method of claim 2, wherein the step of constructing the joint space and the work space of the virtual model comprises:

constructing a coordinate vector of the joint space of the virtual model according to the following formula:

$$\Theta[\theta_1, \theta_2, \theta_3, \gamma]^T;$$

where, $\theta_1$ is an included angle between an inverted massless beam of the virtual model and the sole surface of the robot, $\theta_2$ is a translational primitive of the inverted massless beam of the virtual model, and $\theta_3$ is an included angle between a momentum wheel of the virtual model and the inverted massless beam, $\gamma$ is an included angle between a sole surface of the virtual model and the horizontal plane, and $\Theta$ is the coordinate vector of the joint space of the virtual model.

4. The method of claim 2, wherein the step of constructing the joint space and the work space of the virtual model comprises:

constructing a coordinate vector of the work space of the virtual model according to the following formula:

$$\Phi = [\varphi_1, \varphi_2, y_{com}, z_{com}]^T;$$

where, $\varphi_1$ is an included angle between an inverted massless beam of the virtual model and the z-axis of a Cartesian coordinate system, $\varphi_2$ is the posture of a momentum wheel of the virtual model in the Cartesian coordinate system, and $y_{com}$ and $z_{com}$ are positions of centroids of the virtual model in the Cartesian coordinate system, $\Phi$ is the coordinate vector of the work space of the virtual model.

5. The method of claim 1, wherein the step of performing the posture control based on outer-loop feedback control, inner loop compensation for the external disturbance rejection in position level, inner loop external disturbance rejection via null-space in velocity level, and inner loop external disturbance rejection in force/acceleration level on the robot further comprises:

performing an inner loop feedback control for external disturbance rejection in position level through a preset null space module;

performing an external force estimation through a preset external force estimation module to offset an external disturbance in force/acceleration level;

measuring a waist posture variation of the robot through a preset inertial measurement unit;

transforming the waist posture variation of the robot into a first joint variation of the joint space of the virtual model through a preset first forward mapping module; and transforming the first joint variation into a second joint variation of the workspace of the virtual model through a preset second forward mapping module.

6. The method of claim 5, wherein the step of performing the inner loop feedback control for external disturbance rejection in position level through the preset null space module comprises:

decoupling the first joint variation to obtain a horizontal plane included angle variation and a joint angle variation;

calculating a basis vector of a null space of the joint angle variation using a preset Jacobian matrix; and calculating a joint control compensate angle of the joint space of the virtual model according to the horizontal plane included angle variation, the joint angle variation, and the basis vector of the null space.

7. A non-transitory computer readable storage medium storing instructions executable on a process, wherein the instructions comprise:

instructions for constructing a virtual model of the robot, wherein the virtual model comprises a momentum wheel inverted pendulum model of the robot and an angle between a sole surface of the robot and a horizontal plane; and instructions for performing a posture control based on outer-loop feedback control, inner loop compensation for the external disturbance rejection in position level, inner loop external disturbance rejection via null-space in velocity level, and inner loop external disturbance rejection in force/acceleration level on the robot;

wherein the instructions for performing the posture control based on outer-loop feedback control, inner loop compensation for the external disturbance rejection in position level, inner loop external disturbance rejection via null-space in velocity level, and inner loop external disturbance rejection in force/acceleration level on the robot comprise:

instructions for outputting a control force through a preset closed-loop feedback controller;

instructions for transforming the control force into a reference pose of the work space of the virtual model through a preset admittance operator;

instructions for transforming the reference pose into a first joint reference value of the joint space of the virtual model through a preset second reverse mapping module;
instructions for transforming the first joint reference value into a second joint reference value of the joint space of the robot through a preset first reverse mapping module; and
instructions for performing the posture controls on the robot according to the second joint reference value.

8. The storage medium of claim 7, wherein the instructions for constructing the virtual model of the robot comprise:
instructions for constructing a joint space and a work space of the virtual model;
instructions for mapping a joint space of the robot to the joint space of the virtual model via forward kinematics;
instructions for mapping the joint space of the virtual model to the work space of the virtual model via forward kinematics;
instructions for mapping the work space of the virtual model to the joint space of the virtual model via inverse kinematics; and
instructions for mapping the joint space of the virtual model to the joint space of the robot via inverse kinematics.

9. The storage medium of claim 8, wherein the instructions for constructing the joint space and the work space of the virtual model comprise:
instructions for constructing a coordinate vector of the joint space of the virtual model according to the following formula:

$$\Theta=[\theta_1,\theta_2,\theta_3,\gamma]^T;$$

where, $\theta_1$ is an included angle between an inverted massless beam of the virtual model and a sole surface of the robot, $\theta_2$ is a translational primitive of the inverted massless beam of the virtual model, and $\theta_3$ is an included angle between a momentum wheel of the virtual model and the inverted massless beam, $\gamma$ is an included angle between a sole surface of the virtual model and the horizontal plane, and $\Theta$ is the coordinate vector of the joint space of the virtual model.

10. The storage medium of claim 8, wherein the instructions for constructing the joint space and the work space of the virtual model comprise:
instructions for constructing a coordinate vector of the work space of the virtual model according to the following formula:

$$\Phi=[\varphi_1,\varphi_2,y_{com},z_{com}]^T;$$

wherein, $\varphi_1$ is an included angle between an inverted massless beam of the virtual model and the z-axis of a Cartesian coordinate system, $\varphi_2$ is the posture of a momentum wheel of the virtual model in the Cartesian coordinate system, and $y_{com}$ and $z_{com}$ are positions of centroids of the virtual model in the Cartesian coordinate system, $\Phi$ is the coordinate vector of the work space of the virtual model.

11. The storage medium of claim 7, wherein the instructions for performing the posture control based on outer-loop feedback control, inner loop compensation for the external disturbance rejection in position level, inner loop external disturbance rejection via null-space in velocity level, and inner loop external disturbance rejection in force/acceleration level on the robot further comprise:
instructions for performing an inner loop feedback control for external disturbance rejection in position level through a preset null space module;
instructions for performing an external force estimation through a preset external force estimation module to offset an external disturbance in force/acceleration level;
instructions for measuring a waist posture variation of the robot through a preset inertial measurement unit;
instructions for transforming the waist posture variation of the robot into a first joint variation of the joint space of the virtual model through a preset first forward mapping module; and
instructions for transforming the first joint variation into a second joint variation of the work space of the virtual model through a preset second forward mapping module.

12. The storage medium of claim 11, wherein the instructions for performing the inner loop feedback control for external disturbance rejection in position level through the preset null space module comprise:
instructions for decoupling the first joint variation to obtain a horizontal plane included angle variation and a joint angle variation;
instructions for calculating a basis vector of a null space of the joint angle variation using a preset Jacobian matrix; and
instructions for calculating a joint control compensate angle of the joint space of the virtual model according to the horizontal plane included angle variation, the joint angle variation, and the basis vector of the null space.

13. A robot, comprising:
a preset inertial measurement unit;
a memory;
a processor; and
one or more computer programs stored in the memory and executable on the processor, wherein the one or more computer programs comprise:
instructions for instructions for constructing a virtual model of the robot, wherein the virtual model comprises a momentum wheel inverted pendulum model of the robot and an angle between a sole surface of the robot and a horizontal plane; and
instructions for performing a posture control based on outer-loop feedback control, inner loop compensation for the external disturbance rejection in position level, inner loop external disturbance rejection via null-space in velocity level, and inner loop external disturbance rejection in force/acceleration level on the robot;
wherein the instructions for performing the posture control based on outer-loop feedback control, inner loop compensation for the external disturbance rejection in position level, inner loop external disturbance rejection via null-space in velocity level, and inner loop external disturbance rejection in force/acceleration level on the robot comprise:
instructions for outputting a control force through a preset closed-loop feedback controller;
instructions for transforming the control force into a reference pose of the work space of the virtual model through a preset admittance operator;
instructions for transforming the reference pose into a first joint reference value of the joint space of the virtual model through a preset second reverse mapping module;

instructions for transforming the first joint reference value into a second joint reference value of the joint space of the robot through a preset first reverse mapping module; and instructions for performing the posture controls on the robot according to the second joint reference value.

14. The robot of claim 13, wherein the instructions for constructing the virtual model of the robot comprise:

instructions for constructing a joint space and a work space of the virtual model;

instructions for mapping a joint space of the robot to the joint space of the virtual model via forward kinematics;

instructions for mapping the joint space of the virtual model to the work space of the virtual model via forward kinematics;

instructions for mapping the work space of the virtual model to the joint space of the virtual model via inverse kinematics; and instructions for mapping the joint space of the virtual model to the joint space of the robot via inverse kinematics.

15. The robot of claim 14, wherein the instructions for constructing the joint space and the work space of the virtual model comprise:

instructions for constructing a coordinate vector of the joint space of the virtual model according to the following formula:

$\Theta=[\theta_1,\theta_2,\theta_3,\gamma]^T$;

where, $\theta_1$ is an included angle between an inverted massless beam of the virtual model and the sole surface of the robot, $\theta_2$ is a translational primitive of the inverted massless beam of the virtual model, and $\theta_3$ is an included angle between a momentum wheel of the virtual model and the inverted massless beam, $\gamma$ is an included angle between a sole surface of the virtual model and the horizontal plane, and $\Theta$ is the coordinate vector of the joint space of the virtual model.

16. The robot of claim 14, wherein the instructions for constructing the joint space and the work space of the virtual model comprise:

instructions for constructing a coordinate vector of the work space of the virtual model according to the following formula:

$\Phi=[\varphi_1,\varphi_2,y_{com},z_{com}]^T$;

where, $\varphi_1$ is an included angle between an inverted massless beam of the virtual model and the z-axis of a Cartesian coordinate system, $\varphi_2$ is the posture of a momentum wheel of the virtual model in the Cartesian coordinate system, and $y_{com}$ and $z_{com}$ are positions of centroids of the virtual model in the Cartesian coordinate system, F is the coordinate vector of the work space of the virtual model.

17. The robot of claim 13, wherein the instructions for performing the posture control based on outer-loop feedback control, inner loop compensation for the external disturbance rejection in position level, inner loop external disturbance rejection via null-space in velocity level, and inner loop external disturbance rejection in force/acceleration level on the robot further comprise:

instructions for performing an inner loop feedback control for external disturbance rejection in position level through a preset null space module;

instructions for performing an external force estimation through a preset external force estimation module to offset an external disturbance in force/acceleration level;

instructions for measuring a waist posture variation of the robot through the inertial measurement unit;

instructions for transforming the waist posture variation of the robot into a first joint variation of the joint space of the virtual model through a preset first forward mapping module; and instructions for transforming the first joint variation into a second joint variation of the work space of the virtual model through a preset second forward mapping module.

18. The robot of claim 17, wherein the instructions for performing the inner loop feedback control for external disturbance rejection in position level through the preset null space module comprise:

instructions for decoupling the first joint variation to obtain a horizontal plane included angle variation and a joint angle variation;

instructions for calculating a basis vector of a null space of the joint angle variation using a preset Jacobian matrix; and instructions for calculating a joint control compensate angle of the joint space of the virtual model according to the horizontal plane included angle variation, the joint angle variation, and the basis vector of the null space.

* * * * *